May 30, 1961 R. G. WALKER 2,986,391
COLLATING MACHINE
Original Filed Sept. 27, 1956 8 Sheets-Sheet 1
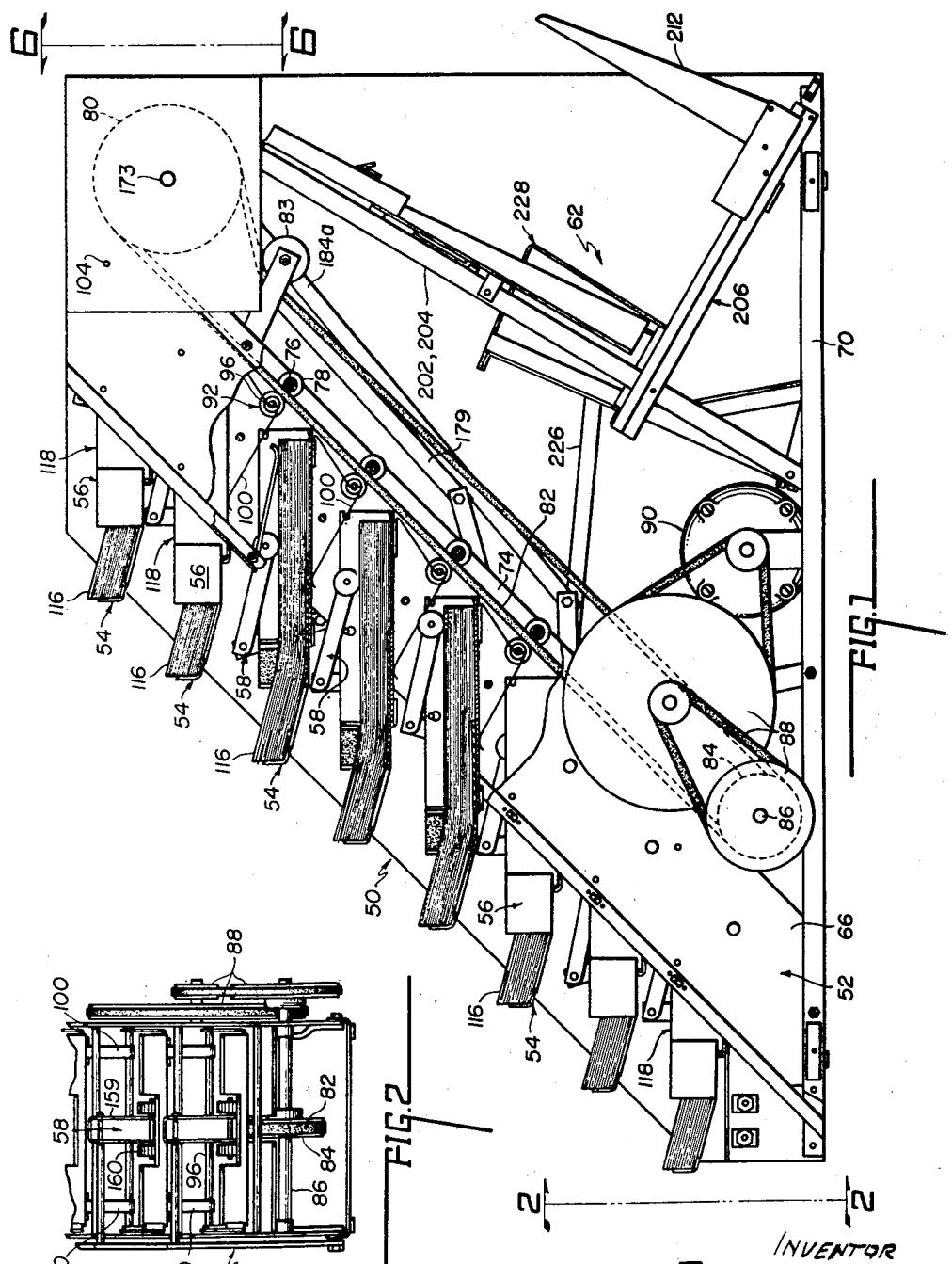
INVENTOR
ROBERT G. WALKER
By Harry N. Hitzeman
ATTY.

May 30, 1961  R. G. WALKER  2,986,391
COLLATING MACHINE
Original Filed Sept. 27, 1956　　　　　　　　　　　　　　8 Sheets-Sheet 2
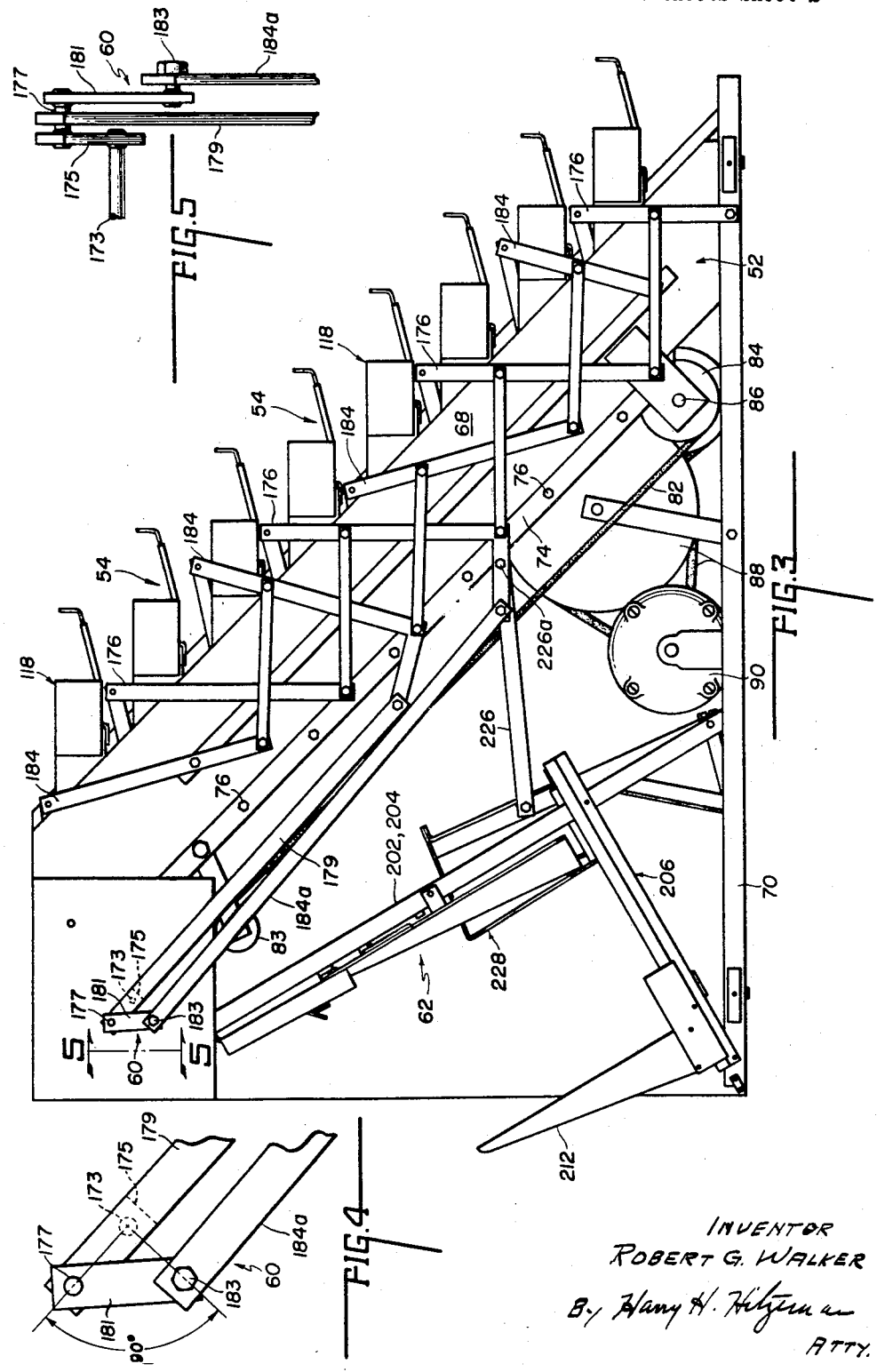
INVENTOR
ROBERT G. WALKER
By Harry H. Hitzeman
ATTY.

INVENTOR
ROBERT G. WALKER
By Harry H. Hitzeman
ATTY

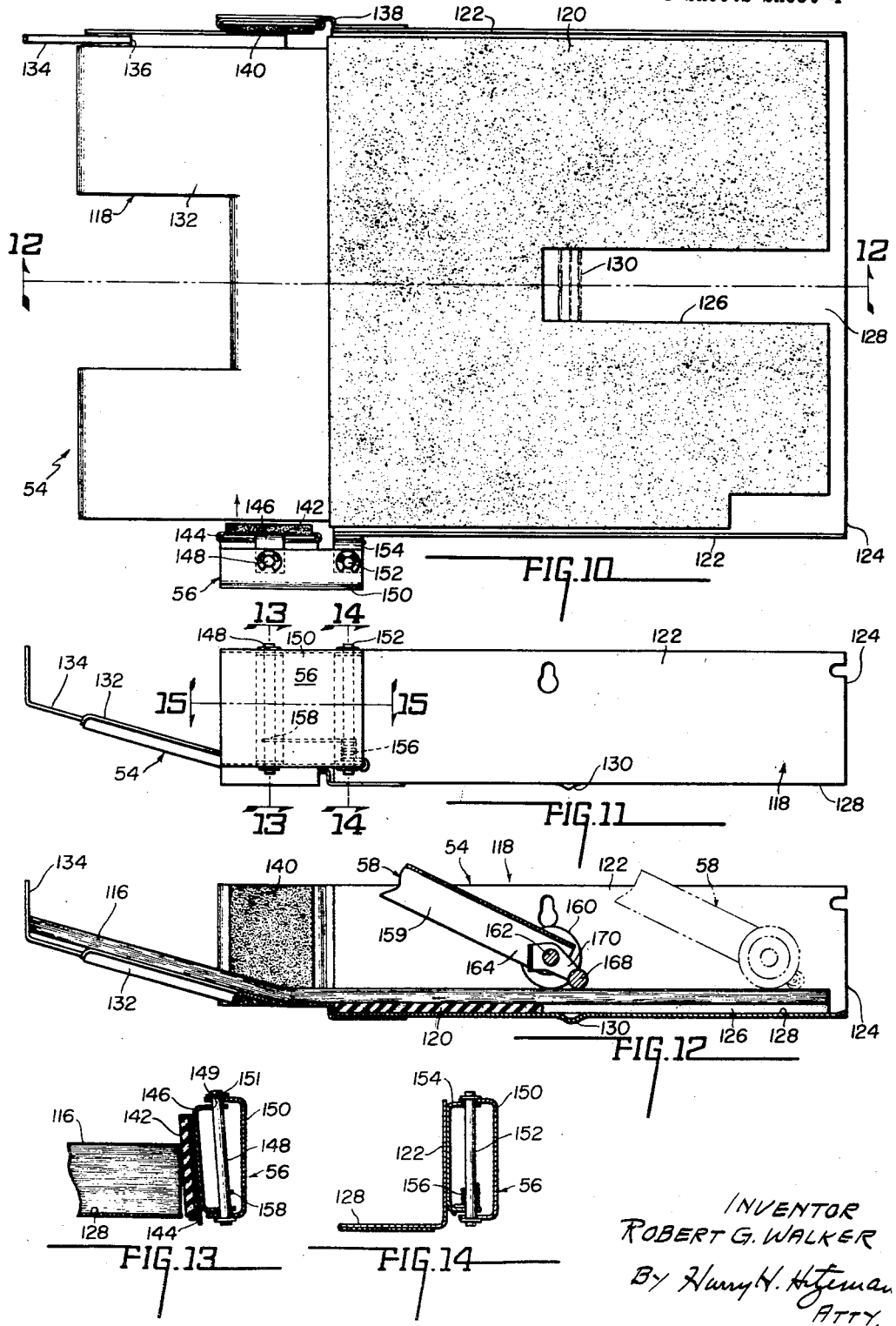

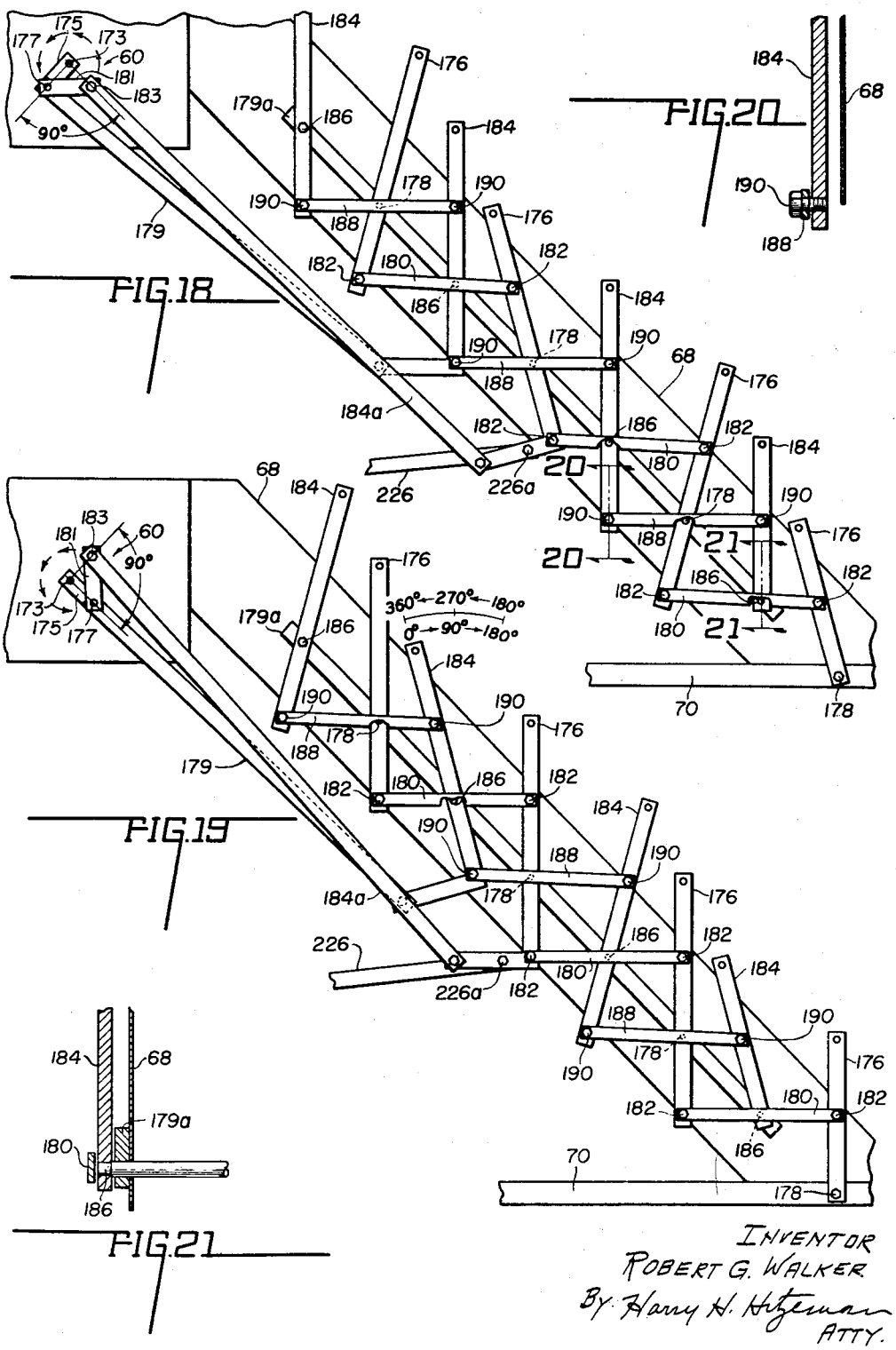

May 30, 1961   R. G. WALKER   2,986,391
COLLATING MACHINE
Original Filed Sept. 27, 1956   8 Sheets-Sheet 6
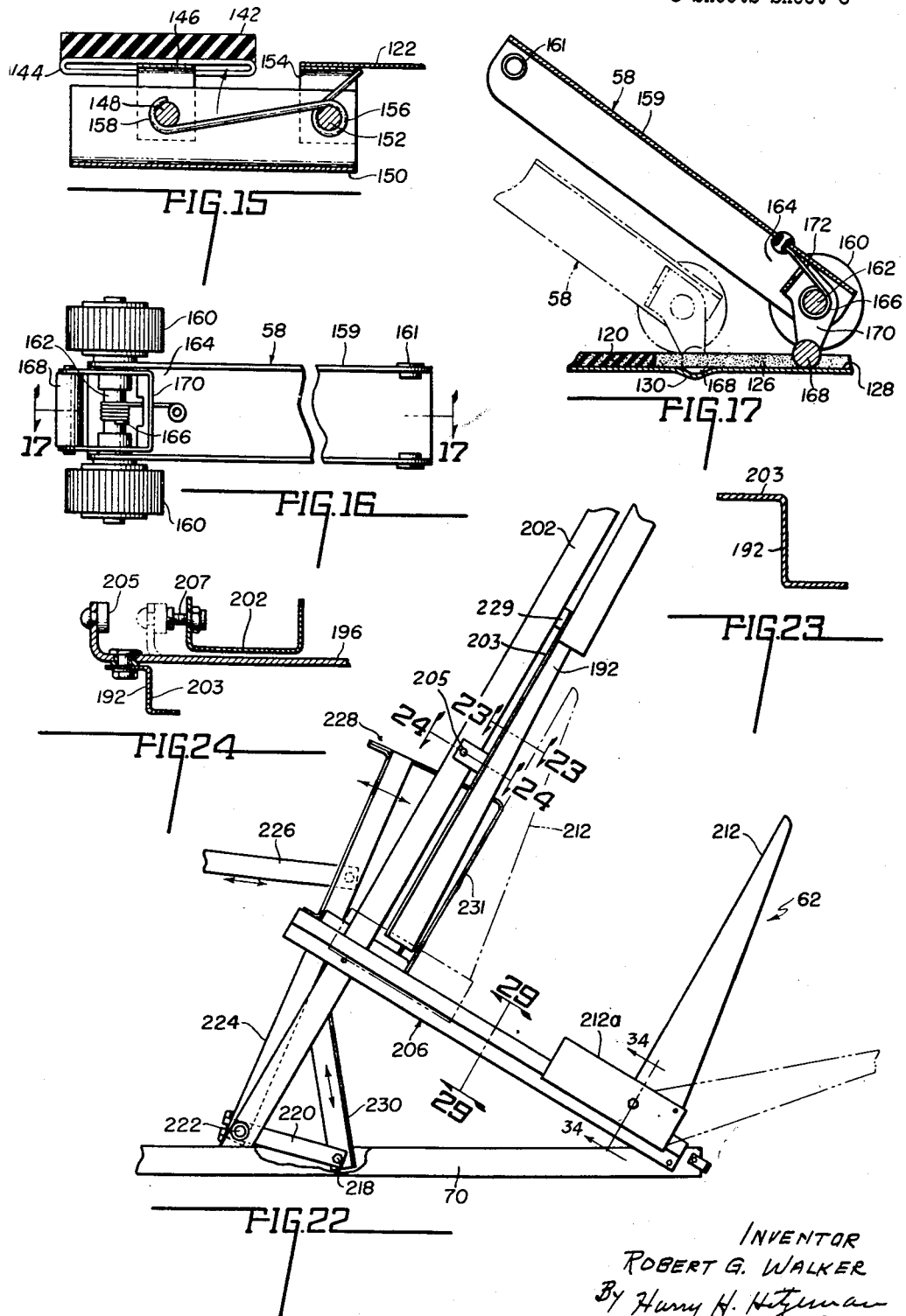
INVENTOR
ROBERT G. WALKER
By Harry H. Hitzeman
ATTY.

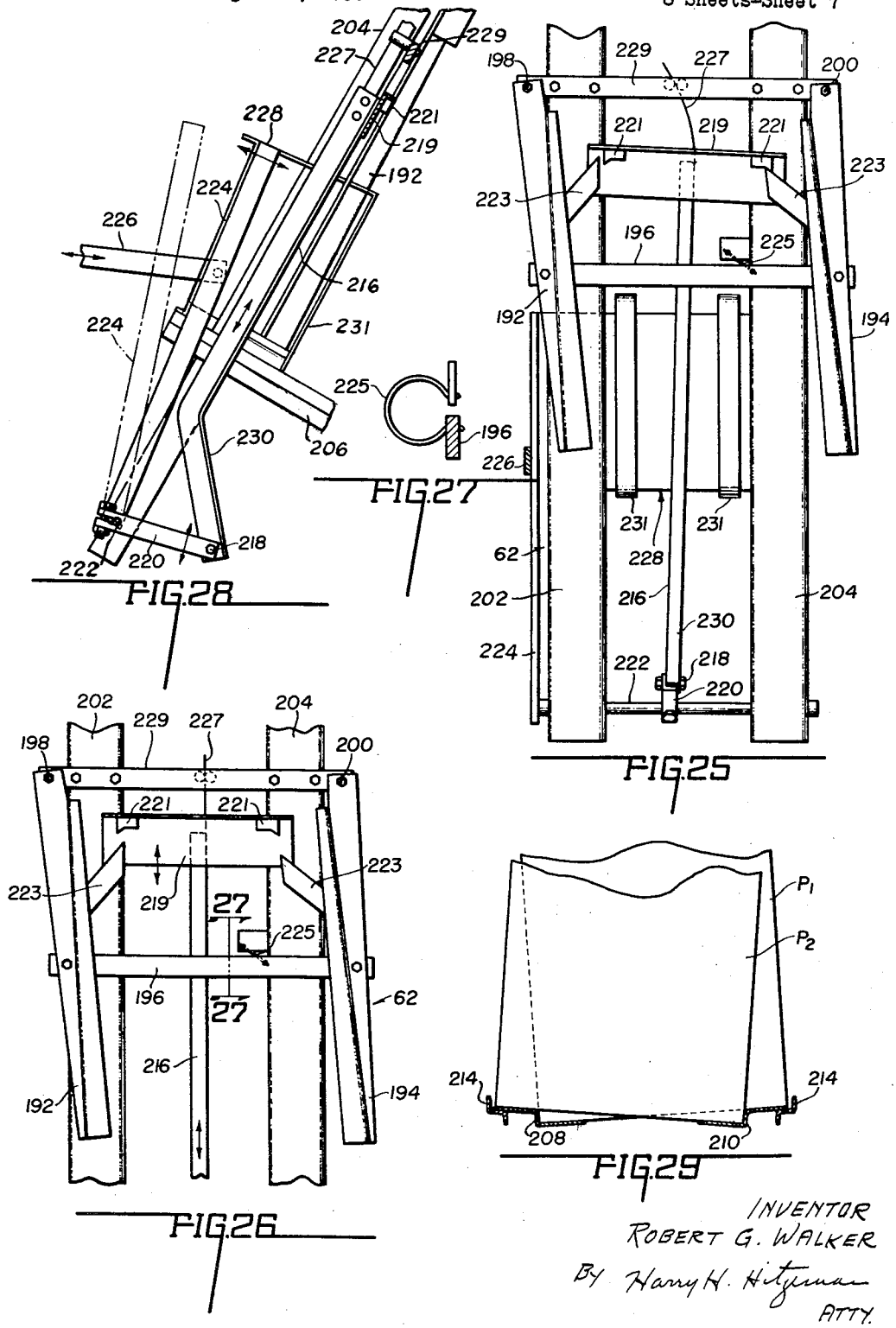

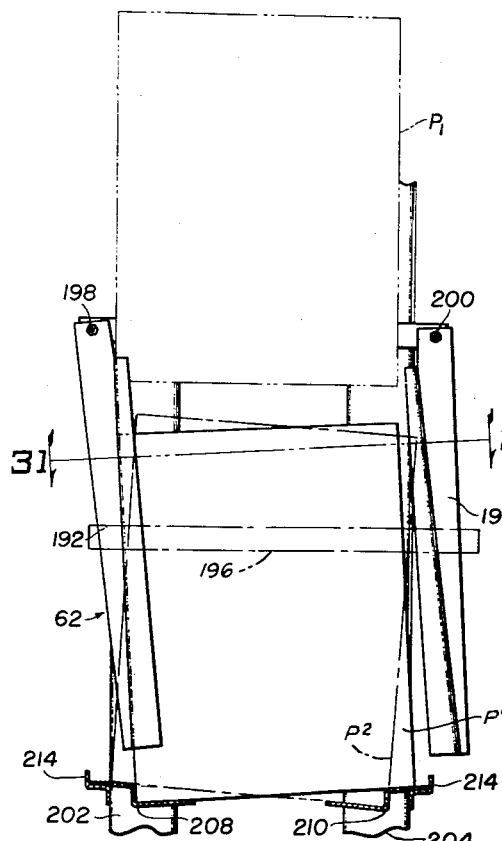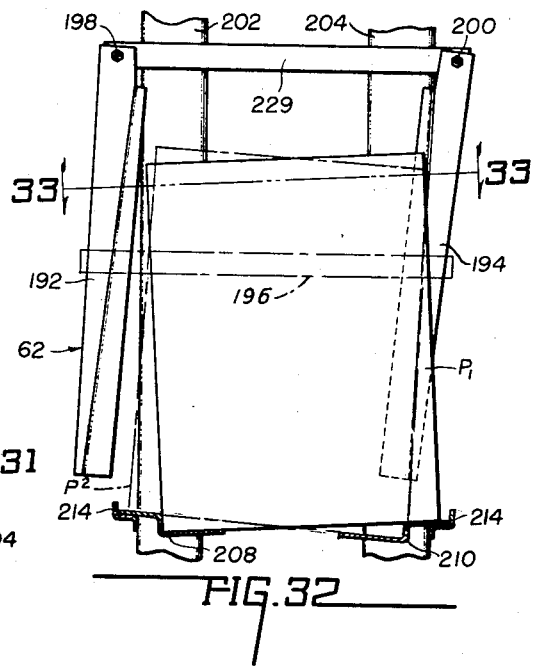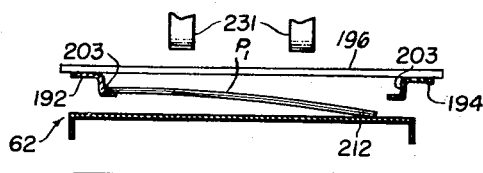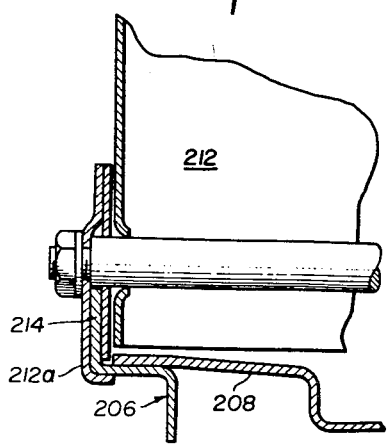

United States Patent Office 2,986,391
Patented May 30, 1961

2,986,391
COLLATING MACHINE
Robert G. Walker, Fort Wayne, Ind., assignor, by mesne assignments, to Halverson Products Manufacturing Company, Chicago, Ill., a corporation of Illinois Original application Sept. 27, 1956, Ser. No. 612,467. Divided and this application Mar. 19, 1958, Ser. No. 722,592

5 Claims. (Cl. 270—58)

This invention relates to a collating machine for assembling sheets of paper, cards and the like into packet form and in some preferred order.

In preparing the machine for operation, a number of individually printed sheets of paper are stacked in separate stations so that each station contains a number of identically printed pages. The order of location of the stations determines the order in which the sheets are assembled in packet form. The underlying principle of the invention is to dispense sheets from the various stations in timed sequence so that separate sheets from each station are laid one over the other in successive order and in registry.

With previous collating machines, there have been several operational difficulties involved in the dispensing of the sheets of paper from their respective stations; namely, dispensing the proper quantity of paper, wrinkling of the paper during the dispensing, and providing that the dispensing devices will completely expend the paper in each station. It is one of the objects of the invention to provide a combination dispensing device and storage means for the paper which will correct these noted deficiencies.

The collating machine is cyclic and during each cycle a sheet of paper is dispensed from each separate storage means in timed relation with respect to each other, and in coordination with a conveyor so that packets of collected sheets are formed in the order of their occurrence in the separate spaced apart storage stations. In order to accomplish this, there must be provided an actuating mechanism for the various dispensing devices which so coordinates the operation of these devices that they will be actuated in the proper sequence.

It is an object of this invention to provide collating machine mechanism which is relatively simple in design, economical to manufacture and efficient in operation.

It is another object of this invention to provide a collating machine feeding mechanism which operates to feed individual sheets of paper from a stock in sequence down to and including the last sheet.

It is still another object to provide in a collating machine a sheet-feeding mechanism which operates to dispense only the top-most sheet from a stack of sheets in sequence.

It is yet another object of this invention to provide a sheet-feeding mechanism operative to dispense cyclically from a plurality of separated storage stations sheets of paper in precise sequential registry.

This application is a division of my co-pending application, Serial No. 612,467, filed September 27, 1956, now abandoned.

Other objects and features of the invention will become apparent from the following description which proceeds with reference to the accompanying drawings, wherein:

Fig. 1 is a side elevation of the collating machine with a portion of the guide ramp broken away to illustrate the storage and dispensing means;

Fig. 2 is a fragmentary front view looking in the direction of the arrows 2—2 in Fig. 1;

Fig. 3 shows the side of the machine opposite that of Fig. 1 and illustrates one position of the leverage operating system;

Fig. 4 is an enlarged view of the crank portion of the leverage operating system (shown reduced in the upper left-hand corner of Fig. 3);

Fig. 5 is an enlarged side view of the crank shown in Fig. 3, looking in the direction of the arrows 5—5 in Fig. 3;

Figs. 10 and 11 are enlarged top and side views, respectively, of the storage means for holding the paper;

Fig. 12 is a sectional view taken on line 12—12 of Fig. 10;

Figs. 13, 14 and 15 are sectional views taken on the respective section lines in Fig. 11;

Fig. 16 is a bottom view of the dispensing device;

Fig. 17 is a sectional view taken on section line 17—17 of Fig. 16;

Figs. 18 and 19 are detail views of the leverage operating system rotated ninety (90°) degrees and one hundred eighty (180°) degrees, respectively, from the position shown in Fig. 3;

Figs. 20 and 21 are sectional views taken on the indicated section lines in Fig. 18;

Fig. 22 is an enlarged detail view of the collector shown in side elevation and detached from the collating machine;

Figs. 23 and 24 are sectional views taken on the respective section lines in Fig. 22;

Fig. 25 shows the guide mechanism of the collector in one angular position, and viewed from the right-hand side of Fig. 22;

Fig. 26 illustrates the next succeeding movement of the elements from the position indicated in Fig. 25;

Fig. 27 is a sectional view illustrating the toggle spring taken on line 27—27 of Fig. 26;

Fig. 28 is a detail view of the linkage for operating the collector;

Fig. 29 is a sectional view of the base of the collector taken on line 29—29 of Fig. 22, and showing two packets of paper positioned on the base of the collector;

Fig. 30 is a detail view of one angular position of the guide members, showing how the incoming packet of papers is directed into the desired angular position with the lower left-hand corner of the packet contacting the tilted supporting edges at the base of the storage;

Fig. 31 is a sectional view taken on section line 31—31 of Fig. 30;

Fig. 32 is a detail view showing the extent of angular movement of the guide members in a direction opposite that shown in Fig. 30;

Fig. 33 is a sectional view taken on the indicated section line in Fig. 32; and

Fig. 34 is a sectional view taken on section line 34—34 in Fig. 22.

Figure 8:
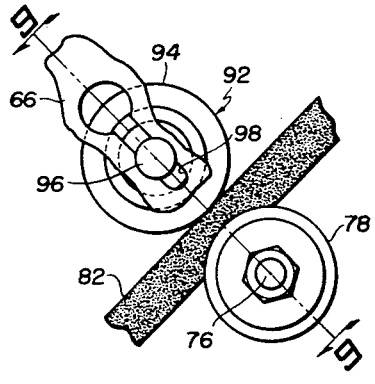
Fig. 8 is an enlarged detail view of the pressure roller and elevator belt assembly.

The collating machine indicated by reference numeral 50 in Fig. 1 comprises generally six subassemblies which are inter-related in operation, as will be evident from a consideration of the functioning of the machine. These subassemblies are designated as a conveyor 52, paper storage stations 54, sheet separators 56, dispensing devices 58, dispensing device actuating system 60, and collector 62. The subassemblies will first be considered separately and then their integration will become apparent from a description of collating machine operation as a whole.

Conveyor

The conveyor 52 includes an inclined ramp 64 (Fig. 9) with turned up sides 66 and 68 which are spaced apart a distance approximately equal to or greater than the width of the paper which is to be collected. The conveyor is supported on a base 70 and upright brace composed of supporting legs 202, 204.

Figure 9:
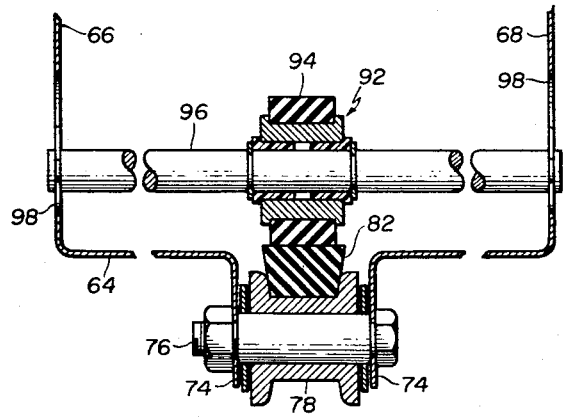
Fig. 9 is a sectional view taken on line 9—9 of Fig. 8.

Referring to Figs. 1 and 9, the inclined ramp 64 is split centrally and has two longitudinally extending flanges 74 through which extend bolts 76 that rotatably support pulleys 78 at spaced apart intervals along the length of the conveyor.

At the top of the conveyor is a power take-off pulley 80. An endless belt 82 of rubber composition or the like is passed over the pulleys 78, the power take-off pulley 80, idler roller 83 and the power wheel 84 (Figs. 1 and 2). The power wheel 84 is mounted on a shaft 86 (Fig. 2) which is driven through a speed reduction belt-and-wheel combination 88 by an electric motor 90 in the manner indicated in Fig. 1.

Opposing the pulleys 78, at the opposite side of belt 82, are a number of pressure rollers 92 having a soft rubber tire 94. The pressure rollers are supported on shafts 96 (Figs. 1, 9) which are floatably received in slots 98 formed in the sides 66, 68 (Figs. 8, 9) of the conveyor. This floatable arrangement enables different thicknesses of packets to pass between the belt 82 and the tire 94 of the pressure roller. Each pressure roller 92 is biased toward the belt 82 by an associated spring strap 100 (Figs. 1, 2) which also serves a a paper guide, as will become apparent from later description.

Figure 6:
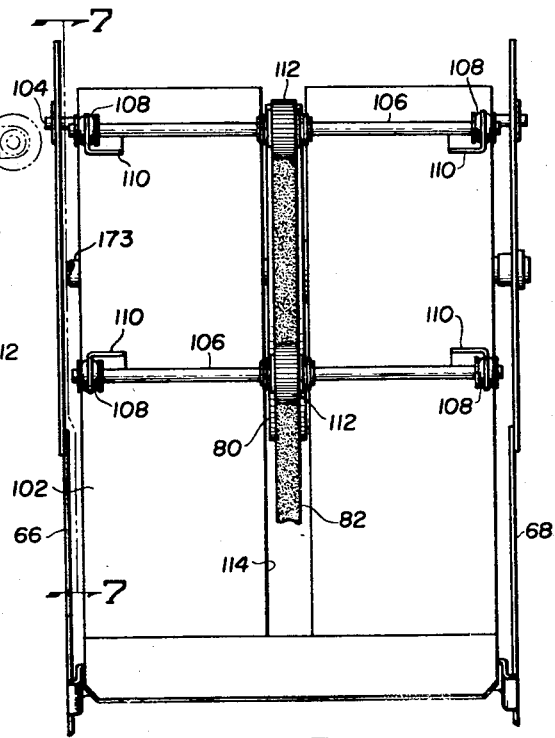
Fig. 6 is an end view of the hood which is located at the uppermost part of the conveyor, looking in the direction of the arrows 6—6 in Fig. 1.

At the end of the conveyor is a guide shield 102 (Figs. 6, 7) that is pivoted at 104 and has a generally semi-circular cross-section to direct the assembled packet of paper from the conveyor 52 to the collector 62.

Three spaced shafts 106 are mounted at the ends thereof (Figs. 6, 7) in rubber grommets 108 held by brackets 110 that are fastened to the shield 102. The rubber grommets urge the shaft 106 and thus rollers 112, which are rotatably mounted on the shaft, toward the belt 82. A slot 114 in the shield permits the rollers 112 to move into contact with the endless belt 82.

Figure 7:
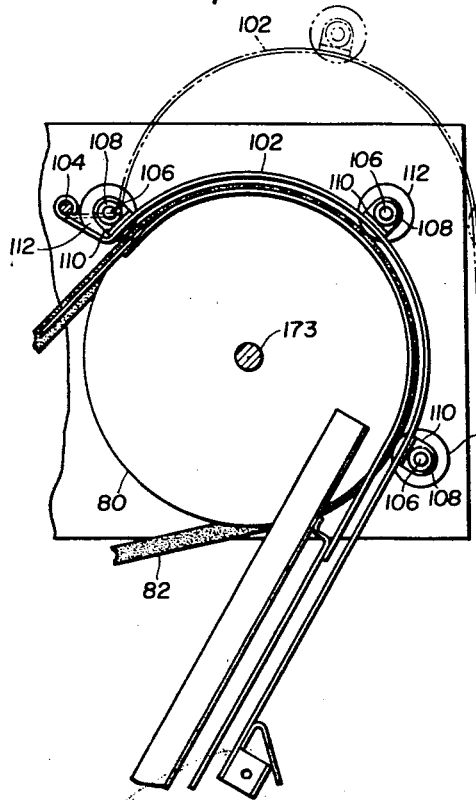
Fig. 7 is a side view of Fig. 6 taken on line 7—7 thereof.

The guide shield 102 may be swung back to the dot-dash line position indicated in Fig. 7 if the assembled packets should jam between the belt 82 and the shield 102 as they move off the conveyor in a direction toward the collector 62.

Storage stations

Along the length of the conveyor 52 (Fig. 1) are eight (8) regularly spaced paper storage stations 54, which are supported horizontally and are arranged in stepped relation. Each paper storage station is identically constructed so that detailed explanation of one will suffice for all.

Sheet paper is stacked into piles 116 in the various stations according to the order of assembly. Thus, the paper stacked at the lowest station in Fig. 1 will be the first in the order of the assembled packet, the paper in the next higher station will become the second sheet in the packet, and so forth on through to the eighth sheet, which is found in the highest station.

Each paper station (Figs. 10, 11 and 12) comprises a tray 118 having a soft rubber mat 120 at the bottom thereof, two (2) sides 122, and an open end 124. A rectangular cutout portion 126 of the mat exposes the base 128 of the tray, and an elongated dimple 130 is formed in the exposed portion of the base 128 for a purpose to be explained later.

An upwardly sloping portion 132 at the rear of the tray provides a curvature in the sheets of paper 116 so that they will have a greater resistance to buckling when load is imposed at the longitudinal edges of the paper. To provide for different lengths of paper, there is added an extendible slide 134 which is adjustably interfitted at 136 with the sloping portion 132 (Fig. 10).

The purpose of the rubber mat 120 is to enable complete dispensing of paper sheets stacked in the tray. The soft rubber mat makes it possible to entirely expend the paper from the tray down to the last sheet of paper, the mat simulating a small stack of paper.

Sheet separators

The purpose of sheet separators 56 is to cause withdrawal of one sheet at a time from the stack 116 contained in the storage station. Whatever is dispensed from each station becomes a page of the assembled packet and so to prevent duplication of pages it is important to limit the dispensing from each station to single sheets.

A sheet separator is provided at each paper storage station 54 but only one will be described since they are all identically constructed.

Referring to Fig. 10 there is provided at one side of the tray 118 a crooked finger 138 fastened at one end to the side 122 of tray 118 and has a rubber pad 140 at the other end which is brought into engagement with the bent or curved portion of the stacked paper 116.

At the opposite side of the tray (Fig. 13) is an inclined rubber pad 142 which forcibly engages the edges of the upper stacked sheets at the bent portions thereof. Bending the sheets increases their resistance to buckling under the clamping load of the two pads 140 and 142.

The rubber pad 142 is mounted on a backing member 144 which is in turn fastened to a bracket 146. A canted pin 148 is passed through openings 149 in the bracket 146 and openings 151 at one end of a channel shaped member 150 which is pivotally supported at the other end on perpendicular pin 152 (Figs. 10, 11, 14). The pin 152 is carried by the side 122 of the tray through a mounting bracket 154.

A torsion spring 156 is wound around pin 152 and has an extended end 158 which bears against canted pin 148, thus tending to turn the channel shaped member 150 in the direction indicated by the arrows in Fig. 10 to forcibly engage the pad 142 with the uppermost sheets of stack 116 (Fig. 13).

The net effect of the frictional engagement of pads 140 and 142 with the edges of the upper sheets is to overcome the frictional contact between the uppermost sheet of the stack and the contiguous sheet so that as the uppermost sheet is dispensed it can be caused to slide over the surface of the contiguous sheet and separated therefrom.

Dispensing device

A dispensing device 58 is provided at each storage station 54 to dispense sheets of paper from the storage station. The dispensing devices are all identically constructed so that the following detailed description of one will suffice for all.

A channel-shaped push rod 159 (Figs. 2, 12, 16, 17) is declined in the direction toward which paper is to be dispensed. The push rod is hinge mounted at one end 161 and has a pair of serrated soft rubber rollers 160 mounted on shaft 162 at the other end 164. A one-way, coil-spring clutch 166 is wound around axle 162 (Figs. 16, 17) to lock the rollers 160 against rotation during movement of the dispensing device in a dispensing direction so that the rollers 160 will push a piece of paper out of the storage station 54 and into the conveyor 52. The limit of movement of the dispensing device in a dispensing direction is indicated by the dotted outline in Fig. 12, and the limit of retractile movement of the dispensing device 58 is shown in full lines.

At the very end of the dispensing device 58 is a lifting roller 168 (Figs. 12, 16 and 17) which is journalled at opposite ends in a bracket 170 pivotally mounted on shaft 162. The roller 168 is displaced sufficiently from the pivot center of the bracket so that the weight of the roller 168 will swing the bracket 170 from the position shown in Fig. 12 to the dotted position shown in Fig. 17 when the paper is completely expended from the tray. The roller 168 enters the dimple 130 and movement of the dispensing device in the dispensing direction will pivot the bracket 170 further until end 172 engages the undersurface of pusher 159 to thereby lift the rollers 160 out of engagement with the rubber mat 120. (Note the clearance between the roller 160 and mat 120 in Fig. 17.) This lifting action will prevent damage to the mat 120 and roller 160 which is locked against rotation during movement in the dispensing direction, since movement of the rollers over the mat surface with the rollers 160 locked could scuff or tear both the rollers 160 and mat 120.

While the dispensing device is being retracted, the rollers 160 are free to turn and thus do not disturb the position of the uppermost sheet next to be dispensed.

*Actuating system*

The actuating system 60 (Figs. 3, 4 and 5) which operates the dispensing devices 58 is motivated by power take-off wheel 80 which is driven by conveyor belt 82 (Fig. 7).

The power take-off wheel 80 turns crankshaft 173 (Fig. 5) and crank 175 (Figs. 3, 4, 18, 19) at the end thereof. The crank has a throw or crankpin 177 which pivotally receives a connecting rod 179, and it will be noted from Figs. 4 and 5 that the arm 181 which is secured to the crankpin 177 extends outwardly to provide a pivotal drive connection 183 which is angularly displaced from the crankpin 177 by ninety degrees (90°) from the axis (173) of rotation of the crank 175. This ninety degree (90°) displacement of drive connection 183 and crankpin 177 is maintained during rotation of the crank 175 since the parts are all secured rigidly together. A second connecting rod 184a is fastened to the drive connection 183 so that rotation of the crank 175 drives the two connecting rods 179 and 184a with ninety degree (90°) phase displacement.

The connecting rod 184a is operatively fastened to a first set of rockable levers 176 (Figs. 3, 18 and 19) which are pivoted at 178 on a reinforcement 179a attached to side 68 of the conveyor. The levers, it will be noted, are alternating levers of a leverage system.

Cross links 180 having articulated connections 182 with levers 176 interconnect the levers so they are caused to move in unison and furthermore, because of the location of the articulated connections relatively to the pivots 178, the adjacent connected levers 176 are caused to swing in opposite directions and are thereby one hundred eighty degrees (180°) displaced in phase of operation.

The connecting rod 179 is operatively secured to a second set of levers 184 which are pivoted at 186 and are interconnected by cross links 188 having articulated connections 190 which cause the levers 184 to move in unison. The adjacent interconnected levers 184 are caused to move in opposite direction and are thus displaced one hundred eighty degrees (180°) in operation.

During a complete cycle of operation, each of the free ends of the levers, which is operatively secured to a pusher 159 of the dispensing device, is rocked from an extreme leftward position (Fig. 19), which is designated "0°" through an upright position of ninety degrees (90°), then to an extreme rightward position 180° whereupon the direction of motion is reversed to the upward position of 270° and finally to its original position of 360°. This rocking movement of the levers is both cyclic and continuous.

Referring still to Fig. 19, the successive levers of both sets of levers are initially arranged so as to be displaced by 90° phase increments and in progressive order. Thus, as the lowest lever is in a 90° position, the next succeeding lever is at a 360° position, the next following lever is at 270° position, the following 180°, the following 90°, and so forth until the uppermost lever is reached.

Since each successive lever is 90° displaced in phase, each set of interconnected levers must be operated with 90° phase displacement. This is properly provided for since, as previously explained, the two connecting rods 179 and 184a which are connected to the respective sets are displaced by 90° according to their connection with the crankpin 177, connection 183 with crank 175. The net result is that the individual levers which are successively displaced 90° in phase and in progressive order are also operated cyclically while maintaining this relative displacement.

With this arrangement, the operation of the dispensing devices 58 is coordinated such that sheets of paper are dispensed from the storage stations 54 in the order of their occurrence in the respective storage stations.

Furthermore, the dispensing of sheets occurs in timed relation with movement of the conveyor belt 82 so that the dispensed sheets are laid one over the other in the order of their occurrence in successive storage trays to make up the assembled packet.

*Collector*

The purpose of collector 62 is to receive and store the packets of assembled paper in such a manner that successive packets are tipped angularly, and being thus staggered it is possible to individualize the packets without leafing through a stack of packets to find the starting and ending sheet of each packet.

The collector comprises two guide members 192 and 194 (Figs. 25, 26, 30 and 32) which are connected together by a transverse strap 196 having pivot connections therewith, said guide members being swingably mounted at 198 and 200 on stationary inclined support legs 202 and 204. Referring to Fig. 24, the limit of angular movement of the guide members is determined by engagement of a rubber bumper 205 on the guide member with an adjustable stop 207 on the support legs 202, 204.

The guide members have guide channels 203 (Figs. 23, 24, 31) which determine the attitude of the incoming packet according to the angular positions of the guide members. Compare the positions of the guide members in Figs. 30 and 32.

Referring to Figs. 1, 3 and 22, there is provided a sloping base 206 which supports the bottom edges of the packets, and these are formed so that there are provided two slightly skewed sides 208 and 210 (Figs. 32, 30) which match the corners of first one packet and then the next to establish a staggered angularity of the packets.

An upright backing plate 212 (Figs. 1, 3, 22) having side mounting brackets 212a (Figs. 23, 34) is slidably received on the upright flanges 214 (Fig. 34) of base 206, and the packets are stacked thereagainst.

To change the angular position of the guide members 192, 194 for each successive packet, there is provided a reciprocable pitman 216 (Figs. 25, 26 and 28) having a cross member 219 with two spaced apart cam blocks 221 that are engageable with upwardly slanting cam followers 223 fixedly secured to guide members 192 and 194, respectively.

A toggle spring 225 is used to hold the guide members 192, 194 in either of the angular positions shown in Figs. 26 and 32.

Spring 227 which is held at one end by fixed brace 229 and is fastened at the other end to the cross member 219 causes the cross member to return to its centered position (Fig. 26) when the cam blocks 221 are moved out of engagement with cam followers 223.

The lower end 230 (Fig. 28) of pitman 216 has a knee bend terminating in a pivotal connection 218 with rocker arm 220. Rock-shaft 222 is secured to rocker arm 220 and a second rocker arm 224 is movable between the angular limits shown in Fig. 28 by an operating lever 226 which is tied at 226a to the lower end of lever 176 adjacent the connection with connecting rod 184a as shown in Fig. 3 to coordinate operation of the collector with the other mechanism of the collating machine. Also tied in with the operating lever 226 is a pusher 228 (Figs. 3, 22, 31 and 33) which is moved against the surface of the last received packet of paper in the guide member to displace it from the guide members 192, 194 and to also shove the backing 212 (dotted lines Fig. 22) farther away from the guide members 192, 194 by a distance equaling the thickness of the packet whereby the guide members may receive a successive packet.

Structurally, the pusher 228 comprises two spaced apart straps 231 (Figs. 31, 33) which pass between the support legs 202 and 204, and guide members 192 and 194. The straps 231 are supported on the rocker arm 224 as indicated in Fig. 22. The pusher is operable in timed relation with the guide members 192, 194, since both the pusher 228 and guide members 192, 194 are controlled by rocker arm 224.

Operation

The collating machine operation will be explained with reference to assembling sheets of paper into an eight page booklet. Sheets 1 through 8 are separately printed and are stacked into the paper storage means 54 so that the lowest tray is filled with sheets of paper which are page 8, the next higher tray is filled with page 7 sheets and so on in sequence to the highest tray which is filled with the last page sheets which in this case is page 1.

The electric motor 90 is energized and the conveyor belt 82 is started running to commence operation of the collating machine. The running belt operates the dispensing device actuating system 60 and the collector mechanism 62.

Referring to Fig. 18, it will be seen that the lowest lever 176 has been rocked angularly to its zero degree (0°) position and in doing so has forced the pusher 159 connected therewith toward the conveyor belt 82. The rollers 160, being locked against rotation when the pusher 159 moves in this direction, frictionally drive the uppermost sheet of paper in the lowest tray 118 between the conveyor belt 82 and pressure roller 92. The flat springs 100 guide the movement of the dispensed sheet so it is properly fed between the pressure roller 92 and conveyor belt 82.

As the first dispensed sheet consisting of page 1 is carried upwardly, the next succeeding lever, being 90° displaced in phase, is actuated from the 270° position shown in Fig. 18 to a 360° position shown in Fig. 19 to cause the associated dispenser to displace the page 2 stored therein. The operation is timed so that the dispensing of page 2 synchronizes with the arrival of page 1 from the lower level and the net result is that both sheets are passed simultaneously through the pressure roller and conveyor belt in exact registry. The two assembled sheets consisting of pages 1 and 2 are henceforth forwarded together.

It will be noted that for each quarter turn of the crank 175 there is a new sheet dispensed and the sheet or sheets on the conveyor will be moved from one station to the next adjoining station to meet the oncoming sheet undergoing the dispensing. Thus, the first quarter turn of the crank 175 from that shown in Fig. 18 to that of Fig. 19 will cause the second station from the bottom to dispense the second sheet in timed relation with the arrival of the previously dispensed page 1 from the bottom station.

At the second quarter turn of the crank 175 (figuring from the initial position shown in Fig. 18) the dispensing device at the third station from the bottom is actuated to deliver a sheet in timed relation with the arrival of the previously assembled sheets one and two.

At the third quarter turn of the crank (Fig. 3) the dispensing device at the fourth station from the bottom is actuated to deliver a sheet in timed relation with the oncoming previously assembled sheets stacked in 1, 2, 3 order. The process continues in quarter cycles until the assembled packet comprising eight pages arrives at the top of the conveyor and is then conducted to the collector 62 by the guide shield 102.

Assuming that the guide members 192 and 194 are positioned as shown in Figs. 25 and 30, the oncoming packet $P_1$ (dotted line Fig. 30) will ride down the side 203 of guide member 192 and in doing so will be tilted angularly so that the bottom left-hand corner will be fitted into the skewed side 208 at the bottom 206 of the collector 62.

After the first packet is received in the collector 62, the reciprocation of lever 226 by the connecting rod 184a will act through the rocker arms 224 and 220 to cause the pitman 216 to rise and thereby disengage the right-hand cam block 221 from the right-hand cam follower 223. The spring 227 will move the cross arm 219 from the position in Fig. 25 to the position in Fig. 26. The toggle spring 224 will maintain the angularity of guide members 192 and 194 as is evident from comparing Figs. 25 and 26.

When the pitman 218 is moved downwardly from the position in Fig. 26, the left-hand cam block 221 moves against the left-hand cam follower 223, and the downward force of the pitman 218 produces a movement about pivot 198 swinging the guides 192 and 194 to the position shown in Fig. 32. Simultaneously the pusher straps 230 are moved from the position of Fig. 31 to the position shown in Fig. 33, where they disengage the packet $P_1$ from the guide member 192 and force the backing plate 212 away from the guide members a distance equalling the thickness of the packet $P_1$.

When packet $P_2$ is dispensed and the guide members 192 and 194 are in the position shown in Fig. 32, further reciprocation of the pitman 216 will bring the right-hand cam block 221' downwardly into engagement with the right-hand cam follower 223 which develops a turning force on the guide member 194, swinging it from the position of Fig. 32 to the position in Fig. 25. The collector 62 is now ready for packet $P_3$ (not shown) which will be tipped the same as $P_1$, but the intervening $P_2$ will separate the packets having the same attitude.

As described, the collector 62 staggers successive packets with a slight angularity to facilitate maintaining them in the individually collected form.

Each time that a packet is delivered to the collector 62, pusher 228 is operated to displace the backing plate 212, which ultimately travels from the dotted-line position (Fig. 22) to the full-line position.

Numerous modifications and revisions will suggest themselves to those skilled in the art, and it is my intention to include those revisions and modifications as embody the principles of the invention within the scope of the following claims.

What is claimed is:

1. The combination with a collating machine having a plurality of paper storage stations located in stepped relationship thereon, of an inclined ramp adjacent one end of said stations, said ramp formed by a pair of spaced inclined Z-shaped base members, each base member having a transverse flange at each end of the same and bolt means fastening juxtapositioned ledges together to form a longitudinal slot between said base members, a plurality of idler rollers mounted in said slot throughout the length of said inclined ramp and an endless conveyor belt passing over said idler rollers and extending above the upper end of said ramp, a plurality of transverse rods connecting the other set of opposite legs of said base members together above the inclined ramp formed by said base members, and a plurality of pressure rollers mounted on said rods above said idler rollers for engagement with said endless belt.

2. The combination with a collating machine having a plurality of paper storage stations located in stepped relationship thereon, of an inclined ramp adjacent one end of said stations, said ramp formed by a pair of spaced inclined Z-shaped base members, each base member having a transverse flange at each end of the same and bolt means fastening juxtapositioned ledges together to form a longitudinal slot between said base members, a plurality of idler rollers mounted in said slot throughout the length of said inclined ramp and an endless conveyor belt passing over said idler rollers and extending above the upper end of said ramp, a plurality of transverse rods connecting the other set of opposite legs of said base members together above the inclined ramp formed by said base members, and a plurality of pressure rollers mounted on said rods above said idler rollers for engagement with said endless belt, said transverse rods carried in elongated slots in said opposite legs of said base members.

3. The combination with a collating machine having a plurality of paper storage stations located in stepped relationship thereon, of an inclined ramp adjacent one end of said stations, said ramp formed by a pair of spaced inclined Z-shaped base members, each base member having a transverse flange at each end of the same and bolt means fastening juxtapositioned ledges together to form a longitudinal slot between said base members, a plurality of idler rollers mounted in said slot throughout the length of said inclined ramp and an endless conveyor belt passing over said idler rollers and extending above the upper end of said ramp, a plurality of transverse rods connecting the other set of opposite legs of said base members together above the inclined ramp formed by said base members, and a plurality of pressure rollers mounted on said rods above said idler rollers for engagement with said endless belt, said transverse rods carried in elongated slots in said opposite legs of said base members, and spring means for biasing said pressure rollers against said belt to grip sheets of paper therebetween for upward movement thereon.

4. The combination with a collating machine having a plurality of paper storage stations located in stepped relationship thereon, of an inclined ramp adjacent one end of said stations, said ramp formed by a pair of spaced inclined Z-shaped base members, each base member having a transverse flange at each end of the same and bolt means fastening juxtapostioned ledges together to form a longitudinal slot between said base members, a plurality of idler rollers mounted in said slot throughout the length of said inclined ramp and an endless conveyor belt passing over said idler rollers and extending above the upper end of said ramp, a plurality of transverse rods connecting the other set of opposite legs of said base members together above the inclined ramp formed by said base members, a plurality of pressure rollers mounted on said rods above said idler rollers for engagement with said endless belt, said transverse rods carried in elongated slots in said opposite legs of said base members, spring means for biasing said pressure rollers against said belt to grip sheets of paper therebetween for upward movement thereon, and said spring means being flat extended spring members which also press against sheets of paper fed from said storage stations to guide the same between said belt and said pressure rollers.

5. An apparatus for collating paper comprising an inclined guide ramp having transverse side ledges, spaced rods connected between said side ledges, idler pressure rollers mounted on said rods medially between said side ledges, said ramp having a medial longitudinal slot with transverse ledges, a power driven endless belt, two pulleys for said belt, one located at the foot and the other at the top of said ramp, said belt positioned in said longitudinal slot in said ramp to carry upwardly sheets of dispensed paper deposited on said ramp, a plurality of paper storage stations located in stepped relation along the length of the inclined ramp for containing stacked sheets of paper to be assembled in the order of their occurence in successive stations, dispensing means operatively associated with said stations for feeding individual sheets of paper from the stations onto the belt, a plurality of transverse bolts connecting said transverse ledges, a plurality of pulleys mounted on said bolts and cooperating with said belt for pressing the same against said pressure rollers to help said belt grip the sheets of paper therebetween and propel them onwardly, coordinated operating means operatively associated with each of said dispensing means for actuation thereof whereby sheets of paper are dispensed onto the belt in the order of their occurrence in successive stations and synchronously with the position of oncoming previously dispensed paper so that the dispensed sheets are stacked in order, and means for collecting the assembled stacks of sheets.

References Cited in the file of this patent
UNITED STATES PATENTS

| | | |
|---|---|---|
| 2,561,223 | Peckham | July 17, 1951 |
| 2,626,149 | Holmberg | Jan. 20, 1953 |
| 2,787,211 | Brown | Apr. 2, 1957 |
| 2,808,262 | Keil | Oct. 1, 1957 |
| 2,827,288 | Geisler | Mar. 18, 1958 |

FOREIGN PATENTS

| | | |
|---|---|---|
| 516,164 | Germany | Jan. 19, 1931 |